E. Heath,
Dovetailing Machine.
N° 39,290. Patented July 21, 1863.
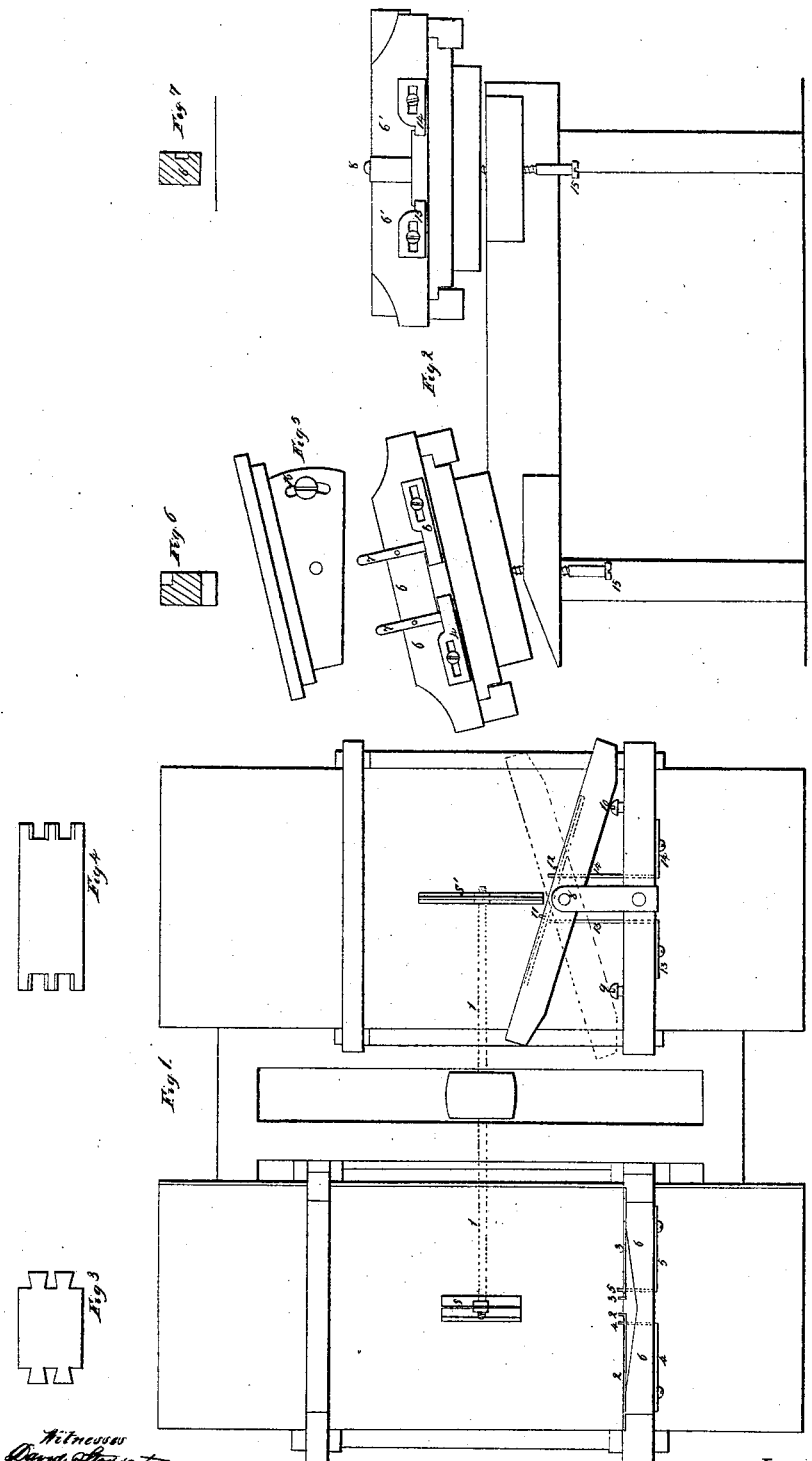

UNITED STATES PATENT OFFICE.

ELANDER HEATH, OF SAN FRANCISCO, CALIFORNIA.

IMPROVED DOVETAILING-MACHINE.

Specification forming part of Letters Patent No. 39,290, dated July 21, 1863.

*To all whom it may concern:*

Be it known that I, ELANDER HEATH, of the city and county of San Francisco, and State of California, have invented certain new Improvements in Dovetailing-Machines; and I do hereby declare that the following is a full and exact description thereof, reference being had to the accompanying drawings, which form a part of this specification.

The improvements consist substantially of an arrangement of the benches, carriages, and gages of circle saws whereby the sides of the dovetail tenons and mortises are finished by the saws to the proper depth, width, and angle, the body of each mortise being afterward removed in the common mortising-machine.

In the accompanying drawings, Figure 1 is a plan, and Fig. 2 an end elevation, of the machine.

1 is a horizontal mandrel with two circle saws, S S', each having an independent bench, that of S being inclined and of S' horizontal. S executes the work on the rectangular end pieces, and S' on the rectangular side pieces, of the box or drawer to be dovetailed. Each saw has a sliding frame or carriage, guided to move at right angles to the mandrel, and each bench may be raised or lowered at one end by the screws 15, having a hinge at the other end in the usual manner.

I will now describe the action of saw S, which cuts end pieces, as shown in Fig. 3, wherein the ends of the mortises and tenons are square with the surfaces and edges of the board, and their sides square with the surfaces, but inclined to the edges of the board, usually about an angle of ten degrees. Now, the inclination of the bench to the axis of the mandrel is the same as this inclination of the sides of the mortises to the edges of the board, the angle of inclination of the bench being adjustable to any required form of dovetail by the slot and lock-screw 16.

The carriage is constructed with its face end 6 vertical and parallel to the mandrel. 2 3 are adjustable spring-gages projecting outside of the face, but elastic enough to be easily pressed back. Their use is to gage correctly the position of each first cut in the board. 4 5 are stiff gage-strips projecting through and past the face end, and adjustable laterally by the slot and lock-screw of each. Their use is to gage the distance between succeeding cuts. Only one being in use at a time, either may be drawn back clear of the face end of carriage by means of its lever 7, which acts as a wedge, or by any other convenient means. The board to be dovetailed is placed against the face end, with its edge touching the gage 2, and its end resting fair on the inclined bench. Then, pushing the carriage toward the saw, a cut is made square with the surface of the board, at an angle to its edge, and of a depth regulated by the elevating-screw. The board is then moved laterally till the gage-strip 4 falls into the saw-kerf. The spring-gages being now pressed back and the gage-strip 5 being drawn back out of the way then another cut is made. Then the board is moved till 4 falls into the second kerf for the third cut, and so on for any number of mortises. This finishes one side of each mortise. The board is then turned with its other side against the face end of carriage, and, with the same face edge (used before) touching spring-gage 3, a cut is made as before. Then the board is moved until gage-strip 5 falls into the kerf and another cut is made, and so on. This finishes the other side of each mortise. The elevating-screw regulates the depth, the inclined table the angle, the spring-gages the relative position, and the gage-strips the distance between the cuts. It is necessary the gage-strips 4 5 should in all cases be equally distant from the side of the saw, so that all the mortises will be equal in width and all the tenons equal; but the mortises may be wider or narrower than the tenons, at the pleasure of the workman, who can adjust the spring-gages to any width of mortise required. The gage-strips should fill the saw-kerf without slackness, or, in case a wide or drunken saw is used, the workman should keep one side or the other of each mortise against the gage-strip. The same face-edge of the board is always used to touch both spring-gages; otherwise inequality in width of a series of boards would cause irregular work.

I will now describe the action of saw S'. The form of side pieces which it saws is shown in Fig. 4, wherein the tenons are of the proper angle and size to fit the mortises of the end pieces, which is attained by correct and mutual adjustment of the various parts. The carriage is similar to the other, except that a vertical swinging face end is attached, as seen in Figs. 1, 2, wherein the center pin 8 is connected to the carriage, and is the center of vibration of the swinging face. 9 10 are adjustable screws passing through the end of carriage, and serve as checks to the swinging face. They are to be adjusted so that when the face is swung into either position— that is, touching the end of either screw—the face will then stand at an angle to the axis of the mandrel, equal to the inclination of the inclined bench (of saw S) to the mandrel. The spring-gages 11 12 are similar to 2 3, and gage-strips 13 14 similar to 4 5, except that no provision is made for drawing them back, as the vibration of the swinging face renders the same unnecessary. The workman manipulates as on the other saw. With the swinging face end touching screw 10, he places the board against the face, its end on the bench, and its face edge touching gage 11, he makes a cut, which is inclined to the surfaces of the board, but intersects the same in lines parallel to its edge. The second cut is made with strip 13 in the first saw kerf, and so on as before. This finishes one side of each mortise. Then the workman swings the face end into the other position—that is, touching 9— and, placing the board with its face edge against gage 12, the other side of each mortise is then finished, as before. When the bodies of the mortises are removed, it will be found that the dovetails of the end and side pieces will fit exactly, provided the angles, the spring gages, and the gage-strips have been correctly adjusted, according to the above directions, and in proportion to the size and form of dovetail required. With regard to the gage-strips 4 5, it is plain that they must be always parallel to the plane of the saw in order to fill the kerf correctly; therefore it is necessary to substitute different strips for different inclinations of the bench. It is true that they could be made adjustable as regards their parallelism to the plane of the saw; but, as there are but few different angles necessary to be employed, I prefer a separate strip for each angle.

Figs. 6, 7 are cross sections of carriage ends, showing recess for the spring-gages.

Fig. 5 is a view of hinged end of inclined bench, showing adjustable slot and screw.

Having now fully described the machine, that which I claim as my invention, and desire to secure by Letters Patent, is—

1. The arrangement of the adjustable inclined bench with its sliding carriage, spring-gages, and gage-strips.

2. The use of the swinging face end with its adjustable screws.

3. The arrangement of the swinging face end in combination with the spring-gages and gage-strips, all attached to the sliding carriage.

ELANDER HEATH.

Witnesses:
DAVID STODDART,
CALEB S. HOBBS.